3,377,271
PROCESS FOR THE TREATMENT OF
WASTE-CONTAINING WATERS
Everett Douglas Cann, Freeport, Ill., assignor of forty
percent to William T. Neiman
Continuation-in-part of application Ser. No. 453,351,
May 5, 1965, which is a continuation-in-part of
application Ser. No. 270,917, Apr. 5, 1963. This
application May 31, 1966, Ser. No. 554,200
12 Claims. (Cl. 210—45)

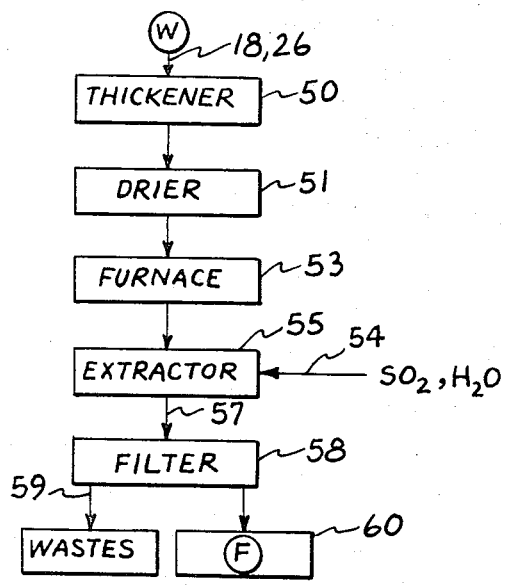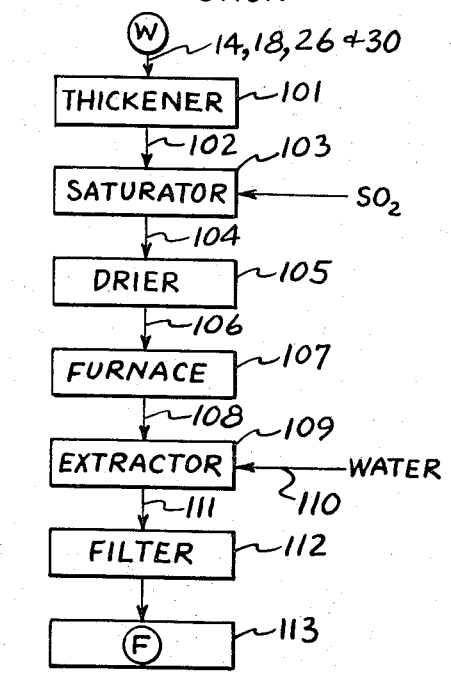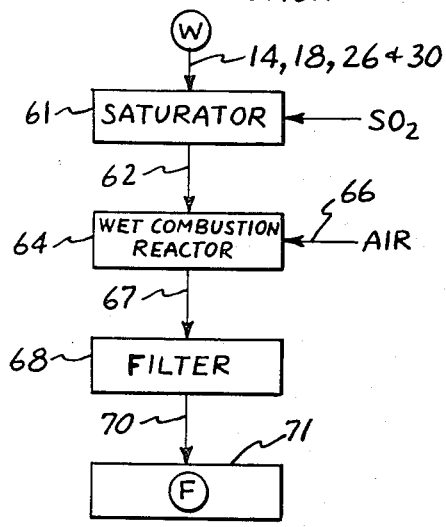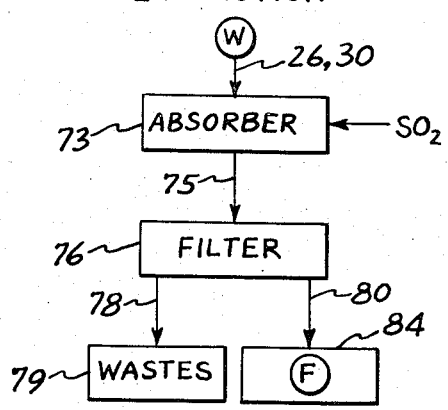

ABSTRACT OF THE DISCLOSURE

Waste-containing waters are treated for purification, disposal, or reuse with a regenerable floc of magnesium or zinc hydroxide. Procedures are described for recovering and recycling the magnesium and/or zinc.

---

Figure 1:
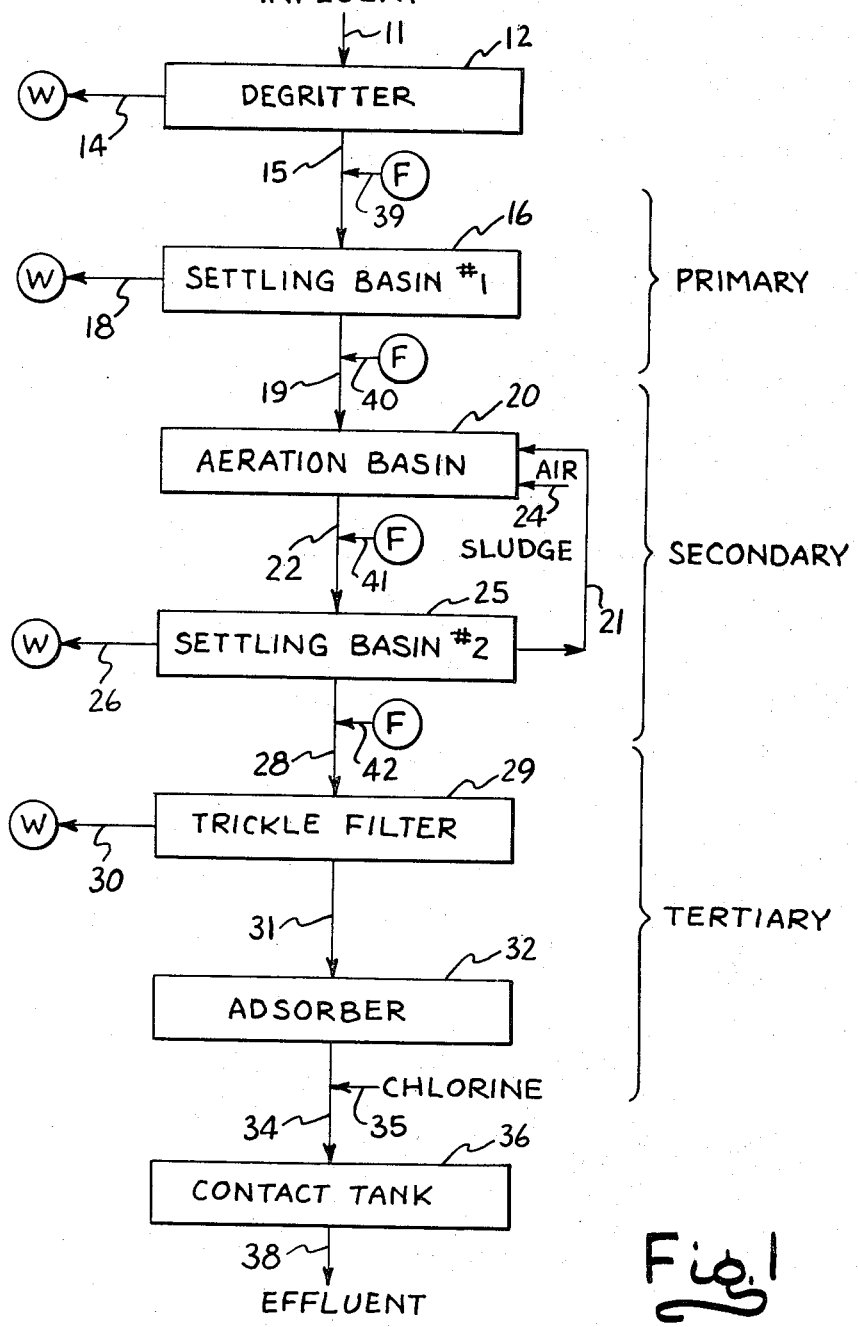

This is a continuation-in-part of my application Ser. No. 453,351, filed May 5, 1965, and now U.S. Patent No. 3,268,443, which in turn is a continuation-in-part of my application Ser. No. 270,917, filed Apr. 5, 1963, now abandoned.

This invention relates to the treatment of waste-containing waters for purification, disposal, or reuse. More particularly, the invention provides a process for treating either industrial or domestic waste liquors, or to the purification of contaminated natural waters to render them potable.

Efficient water treatment—both for purification and disposal—is important to the health of any community. Purification of contaminated natural water to render it potable is an obvious necessity. On the other hand, industrial and domestic waste water, generally in the form of water containing minor amounts of suspended and dissolved organic and inorganic solids, must also be treated to condition the water before releasing it to rivers or lakes.

A variety of different techniques are available for treating waste-containing waters. In general, these include a primary stage for physically separating settleable insoluble wastes from the water, a secondary stage for contacting the contaminated water with a molecular oxygen containing gas to effect aerobic bacterial and chemical oxidation of colloidally dispersed and dissolved wastes, and a tertiary stage in which contaminated water is subjected to the chemical and physical effects of chemical flocculation and is contacted with an adsorbent to remove dissolved and suspended wastes, microorganisms, etc. Depending on the degree of initial contamination and the extent of purification required, one or more of the foregoing stages may be eliminated, or in some instances may be supplemented by further treatment.

A common denominator in all processes for treating contaminated waster is that the wastes are usually in a low concentration. Consequently, the equipment is almost inevitably large in size and expensive to install and maintain.

It has long been recognized that waste water treating equipment may be reduced in size and increased in efficiency by supplementing the treatment outlined above wth chemical flocculating agents. These are either inorganic materials (such as aluminum sulfate, iron sulfate or chloride, magnesium or zinc sulfates), or various hydrophylic organic polymers which form a sticky floc. This floc combines with suspended waste solids and accelerates gravity settling of the solids. In addition, flocculating agents coalesce any colloidally suspended waste solids which would otherwise be immune to gravity settling.

However the advantages of flocculating agents are not without concurrent difficulties. Chief among these is the cost of flocculating agent. It is accordingly a primary objective of the present invention to provide an improved process for treating waste-containing waters using flocculating agents which are capable of facile regeneration and recycle.

A concurrent object of the invention is to provide an improved water treatment process that may be incorporated into existing water purification of water disposal plants currently in existence, or which may be designed into newly-built plants. When installed in existing waste water treatment plants, the inventive process permits an increase in throughput capacity without the addition of substantial capital equipment; alternatively, or in conjunction therewith, it permits of more efficient water treatment, that is, the discharge of a higher purity effluent. Similarly, in water purification plants the same advantages are achieved, with the further benefit that the cost of flocculating chemicals is reduced significantly in comparison with conventional flocculation.

Another objective of the invention is to provide a processing technique for inclusion into newly designed plants, which technique allows such plants to eliminate heretofore essential but expensive treatment steps. Otherwise stated, inclusion of the inventive process into a waste water treatment plant permits overall simplification of the treatment process by eliminating one or more water treatment stages.

Still another object is to permit new plants to be smaller in size and/or have greater treatment efficiency than would otherwise be possible.

Yet a further object is to provide an improved step in the treatment of waste-containing waters which does not require substantial equipment or excessive operating charges.

Further objects, aims, and advantages of the invention will become apparent as the description thereof proceeds.

Briefly, and in accordance with the invention, I enhance the effectiveness of waste-containing water treatment techniques by introducing, as a flocculating agent, a soluble sulfur oxide salt of magnesium and/or zinc (e.g., zinc or magnesium sulfate, zinc or magnesium bisulfite, or zinc or magnesium bisulfate), which is alkalized to form a magnesium or zinc floc. The resultant floc coalesces suspended solid wastes which are then collected and contacted with an aqueous sulfur oxide ($SO_2$ and/or $SO_3$) to dissolve and thereby recover the magnesium and/or zinc as a soluble sulfur oxide salt. The resultant salt is then available for cycling back to the initial flocculation step or steps.

In one form of the invention, a stream of the magnesium or zinc floc and coalesced wastes is burned under combustion conditions (dry combustion) to burn off the waste and to form magnesium or zinc oxide as part of the furnace ash. The ash is then contacted with water and with a sulfur oxide to dissolve or extract the magnesium or zinc as the soluble sulfur oxide salt, which is then in a form suitable for recycling.

In a second form, the stream of magnesium or zinc floc and coalesced wastes is first contacted with sulfur oxide (or a sulfur oxide affording substance such as elemental sulfur) to form the sulfur oxide salt, and the wastes and salt burned under combustion conditions (dry combustion) to burn off the wastes and provide a furnace ash containing the magnesium or zinc as a soluble sulfur oxide salt. This salt is extracted with water and is used to provide recycle flocculating agent.

In a third form, the aqueous stream of floc and coalesced wastes is first contacted with gaseous sulfur oxides or an aqueous solution of the same to form magnesium or zinc sulfur oxide salts, and the resultant slurry subjected to liquid phase combustion with an oxygen-containing gas. The product is a solution containing soluble sulfur oxide salts (chiefly as the sulfates) of magnesium or zinc, which may be recycled to the flocculating step.

In a fourth form, oxidation of the wastes is made unnecessary, and instead the aqueous stream of floc and waste is contacted with gaseous sulfur oxide or an aqueous solution of the same to dissolve and extract the magnesium or zinc as the corresponding soluble sulfur oxide salt. The resultant slurry is physically treated, as by filtration, centrifugation, etc. to separate the waste solids from the solution, which may then be recycled.

A particular advantage of the invention is that it may be incorporated into diverse types of water treatment processes. The description of the invention herein includes, in schematic form, a generalized process for the treatment of waste-containitaing water, it being understood at the outset that existing processes frequently omit one or more of the treatment steps, and may include additional steps.

The invention in its various aspects will be more fully described in the enusing specification, which is to be read in conjunction with the annexed drawings wherein:

FIGURE 1 depicts schematically a generalized process for the treatment of waste-containing water, which process advantageously incorporates the improvement of the present invention;

FIG. 2 schematically depicts a flow sheet of the first form of the invention which includes dry combustion of a mixture containing an hydroxide floc and separated wastes;

FIG. 3 schematically depicts a flow sheet of the second form of the invention, which includes dry combustion of a mixture containing sulfur-oxide treated floc and wastes, and includes extraction from the furnace ashes;

FIG. 4 schematically depicts a flow sheet of a process according to the third form of the invention which involves wet combustion of the aforesaid mixture containing controlled amounts of sulfur oxides; and FIG. 5 schematically depicts a flow sheet of a fourth form of the inventive process which eliminates any combustion of the wastes.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the invention is to cover all modifications, equivalents and alternatives falling within the spirit and scope of the invention as expressed in the appended claims.

Turning first to FIG. 1, the schematic flow sheet will be recognized as illustrating a three stage process for treating waste-containing water. Initially, the influent 11 is passed to a degritter 12 for the purpose of removing gross particles of solids; a degritter is, in essence, a mechanical filter which separates solid wastes W14 from the remaining stream.

The effluent 15 from the degritter 12 then is usually passed to a first settling basin 16 as the primary stage. Here the finely dispersed but non-colloidal insoluble wastes are settled out in the form of a concentrated sludge, also designated as a waste stream W18, and the water discharged via conduit 19 to the aeration basin 20. Physically, the settling basin 16 is usually a thickener tank, but may be or include a clarifier, a bank of hydrocyclones, a filter, or the like, each of which performs a physical separation of insoluble wastes from the water.

From the settling basin 16 the effluent 19 then generally passes to an aeration basin 20 which is charged with a recirculating activated sludge stream 21 containing aerobic bacteria. The sludge commingles with the influent 19 to the aeration basin 20 and, under the influence of a myriad of finely dispersed air bubbles 24, digests dissolved and suspended wastes by bacterial action to support growth and multiplication of bacterial cells, which by aggregating with the suspended solids produce settleable particles.

From the aeration basin 20, the effluent is sent to a second settling basin 25 (which may be similar to the previous settling basin 16) which separates treated water from sludge for recirculation via conduit 21 and as a waste stream W26, above.

Leaving the settling basin, the water 28 may then be sent to a tertiary stage for additional treatment. Such tertiary stages are becoming increasingly popular as the requirements for a more highly purified final effluent become widespread. Tertiary stages further purify the waste-containing water through occlusion by the floc and by contact with the floc and other adsorbents to effectively remove traces of dissolved and suspended wastes. In the illustrative embodiment shown above, the tertiary stage consists of a sand or trickle (trickling) filter 29 filled with graded sand, the initial sand layer being coarse and the final sand layer or layers being fine. This arrangement of at least two grades of sand permits the inclusion of a filter aid such as a flocculating agent or diatomaceous earth, which collects on the coarse sand but which would soon plug the fine sand. Wastes and filter aid may be removed from the trickle filter by backflushing, and are shown in the above flow sheet as stream W30 leaving the trickle filter.

From the trickle filter the water filtrate 31 is sent to an adsorber 32 where additional dissolved and suspended wastes are removed. The adsorber 32 contains a surface active material such as finely divided soft coal, charcoal, activated carbon, or the like, or may be or include a cationic or anionic ion exchange resin, depending upon the ultimate purity requirements of the effluent.

After the adsorber 32, the water 34 may be sent to a flash contact tank 36 for admixing and reaction with chlorine gas 35 for final purification of the effluent 38.

The various waste streams W may be treated, according to conventional practice, to either recover the wastes (which are valuable as fertilizers), to dispose of the wastes (usually by burning), or obtain combustible gases (CO and $CH_4$) by anaerobic digestion. According to the present invention, these wastes or a portion thereof are further treated to recover the magnesium or zinc, a feature of the invention being that the processes herein may be applied to all or portions of the waste stream W, to an anaerobically digested waste, or to a burned waste.

As before stated, it is commonplace to employ only some of the treatment steps or stages indicated above; the entire combination is capable of rendering a municipal waste suitable for drinking purposes, but is rarely necessary or desirable. For example, comparatively few plants at present use a tertiary stage, and many omit either the primary stage or the secondary stage. But in any event, all plants for treating waste-containing water separate as much as possible of the waste from the water, and all are improved by incorporating the improvement of the present invention.

In the schematic flow sheet several streams 39, 40, 41, 42 are shown as F, or flocculating agent streams. One or more of such streams may be used, it being an advantage of the invention that the availability of a low cost and re-usable flocculating agent permits unusual improvement in the operation of the primary, the secondary, and/or the tertiary stage. (See FIG. 1.)

In whatever stage or stages the inventive flocculating agent is added, it is introduced in the form of a soluble sulfur oxide salt of magnesium or zinc, or a mixture of such salts, as will be described hereinafter. The salt is then treated with an alkali such as calcium or sodium hydroxide to provide a slightly alkaline environment in which the soluble sulfur oxide salt of magnesium or zinc forms the hydroxide by a double displacement reaction. It is this hydroxide which is the sticky floc used herein.

When the inventive flocculating agent is added to the primary stage, it is introduced preferably into a mixer disposed between the degritter 12 and the first settling basin 16 (FIG. 1). The alkali may be added concurrently with or before or after the flocculating agent, depending upon individual choice and circumstances, but for simplicity is omitted from the FIG. 1. Formation of the floc occurs rapidly, and is effective at concentrations of as little as 5 p.p.m. or less to as much as 500 p.p.m. or even more. Indeed, a particular advantage of the re-usable floc invention is that large amounts of flocculating agent may be used, which affords formation of a considerable amount of floc for rapid and thorough flocculation.

The floc forming in the first settling basin 16 occludes suspended solids and is withdrawn via the symbolic stream W14 leaving the first settling basin 16. This stream is then treated for recovery and recycle of the magnesium and zinc values, as will be described presently.

The effluent 19 from the first settling basin, that is, the stream going to the secondary stage, similarly benefits from the inclusion of the inventive flocculating agent, shown as stream F40 joining the water 19 entering the aeration basin 20. The alkalinity here may be adjusted to a neutral or alkaline pH, e.g., above about 7.0 and below about 9.0, by the addition of any necessary alkali to form the floc.

In the aeration basin 20, it is found that the presence of a substantial floc has a multiple effect. First, the admixture of floc and activated sludge appears to enhance biological activity of the aerobic bacteria. Second, the presence of a floc serves to entrap the fine air bubbles and thereby facilitate distribution of the air into the treated liquid. Third, it appears that a large amount of floc in combination with the activated sludge provides an environment specially conducive to the removal of organic phosphate wastes and inorganic detergent residues. This latter benefit is particularly noteworthy in view of current interest in removing detergent residues from municipal waste water effluents.

When the flocculating agent is or contains magnesium, the resultant floc is sufficiently light in weight such that intensive aeration may form a substantial scum composed of sludge, magnesium, hydroxide, and occluded air bubbles. In many instances this becomes a real advantage, in that scum can readily be removed and concentrated. Apparatus for removing both scum (at the top of an aeration vessel) and sludge (at the bottom) are well known, and are represented by the Rex Float-Treat Separator and Thickener (see Bulletin No. 315–101, by Rex Chainbelt Inc., copyright 1962). Moreover, magnesium hydroxide floating scums are readily adaptable to aeration under superatmospheric pressure, in addition to the more conventional atmospheric aeration.

If desired, flocculating agent 41 may be introduced between the aeration basin 20 and the settling basin 25 to further improve the effectiveness and throughput rate of the latter. The agent here may be introduced irrespective of whether there has been upstream flocculation, and has the manifest advantage of increasing the settling rate in this basin.

The mixture of magnesium or zinc hydroxide with sludge, i.e., wastes, is withdrawn from the second settling basin 25 as stream W26.

Following the second settling basin 25, a stream 42 of flocculating agent may be added prior to introduction into the filter 29. This is rarely necessary if there has been sufficient upstream flocculation, but in particular circumstances, especially when the adsorber 32 is being called upon to effect substantial removal of dissolved and suspended wastes, a flocculating agent upstream of the filter 29 substantially reduces the adsorber load. Flocculating agent here entraps waste solids on the coarse sand layer of the filter 29, and is back-flushed off periodically as a waste stream W30 shown leaving the filter 29.

As stated before, one of the outstanding advantages of the present invention is that it greatly increases the throughput capacity of a given treating stage, it improves the efficiency of treatment in such stage, or it performs both functions. Thus, sufficient flocculating agent in the first settling basin 16 may readily reduce the settling time to one-half, or sometimes even as little as one-fourth of the time to achieve a given purification than had previously been possible. As a consequence, the throughput to a settling tank may be increased by a factor of two or even more without adversely affecting its performance.

Similarly, a soluble sulfur oxide salt of magnesium and/or zinc introduced into the aeration basin 20 can often permit doubling of the throughput through a secondary stage. Moreover, the degree of purification in this stage is frequently higher than when performed in the absence of a flocculating agent.

The combination of flocculation in the first settling basin 16 and flocculation in the secondary stage has a multiple effect on the permissible capacity of any given contaminated water treatment process. By removing more of the solids in the first settling basin 16 or primary stage, this reduces the load on the aeration or secondary stage 20, 25 and thus allows a vastly greater throughput into the system without incurring any significant disadvantages.

As before stated, it is necessary to recover magnesium or zinc values from the wastes in order to realize optimum benefits of the invention. Such recovery is effected, according to one aspect of the invention, by burning the mixture of waste and hydroxide floc W to oxidize the waste and recover an ash containing magnesium and/or zinc as the oxide, per FIG. 2, or as the sulfur oxide salt per FIG. 3. This combustion may be effected in conventional furnaces or kilns, advantageously after thickening and drying the waste-floc mixture to remove gross amounts of water. It is preferred however to maintain the burning temperature below about 1800° F. so as not to sinter or dead burn the resultant magnesium and/or zinc oxide. Alternatively, a low temperature dry combustion may be used (i.e., below 1500° F., preferably below 1400° F., per FIG. 2); a submerged or wet combustion process (per FIG. 4) may be used (e.g., U.S. 2,665,249); or combustion may be eliminated entirely (per FIG. 5).

After burning as shown in FIG. 2, the resultant ash contains magnesium or zinc oxide together with ash from organic and inorganic components of the original waste. In addition, there may be more or less of calcium compounds resulting from alkalization of the flocculating agent. It is accordingly desired to separate, as nearly as possible, substantially all of the magnesium and/or zinc from the ash.

Such separation is accomplished, pursuant to the invention, by treating an aqueous ash slurry with sulfur oxide, that is, sulfur dioxide and/or sulfur trioxide to produce sulfites, bisulfites, sulfates, and bisulfates. Where the sulfur oxides present in the gases formed by the burning of sulfur and/or sulfur containing materials (such as coal) is predominately sulfur dioxide, more sulfites and bisulfites than sulfates and bisulfates are formed in this treatment. The monosulfites of magnesium and zinc are insoluble, while the corresponding bisulfites are readily dissolved in water. The mono-sulfur oxide salts form at a pH of about 7.0, while the bisulfur oxide salts form at a pH of about 4.5; therefore, the pH of the ash slurry should be lowered to about 4.0 by the use of excess sulfur oxides to effectively extract magnesium and/or zinc from the furnace ashes.

To a considerable extent the purity requirements of the final effluent in respect to hardness or salt contamination dictates the choice between sulfur trioxide and sulfur dioxide, and this must be correlated with the particular alkali used in forming the floc. Sodium salts, resulting from the use of caustic, are soluble and will lead to salt contamination of the treated water. By the same token, calcium sulfate is relatively soluble—much more so than calcium sulfite—and accordingly sulfur trioxide extraction of ash which contains substantial amounts of calcium is undesirable where the effluent must be low in calcium.

Sulfur dioxide and/or sulfur trioxide may be obtained from a variety of sources. Elemental sulfur or sulfur-containing materials may be burned locally in a conventional type of sulfur burner or in the furnace used to burn the waste, to produce a sulfur dioxide gas containing a minor amount of sulfur trioxide, both of which may be scrubbed out by contacting the gas with a slurry of zinc and magnesium-containing combustion ash in water. Alternatively, liquid sulfur dioxide, liquid sulfur trioxide or sulfur oxide containing industrial waste gases may be used as a source of sulfur oxide.

If low hardness or salt contamination of the treated water effluent is not a requirement of the process, it is desirable to extract magnesium and/or zinc from the stream as their sulfates rather than the bisulfites: sulfates are sufficiently soluble for use in the process. In the case of the sulfate one atom of sulfur associates with one atom of magnesium or zinc, and accordingly only one equivalent of calcium or sodium hydroxide is required to react with the salt to form the floc. However, in the case of the bisulfites two atoms of sulfur associate with one atom of zinc or magnesium, and thus two equivalents of calcium or sodium hydroxide are required. Therefore, half as much sulfur and lime are required to produce one molecule of hydroxide floc from the sulfates as are required for the bisulfites. For this reason it is desirable to maximize the formation of sulfur trioxide in the oxidation of the sulfur, or to oxidize the bisulfites and sulfites to sulfates. In this latter connection it may be advantageous to oxidize the magnesium bisulfite solution to magnesium sulfate by the use of oxygen containing gases (after adjusting the pH to about 8.0 with magnesium hydroxide). This secondary oxidation can be effectively catalyzed by introducing small amounts of nitrogen oxides in the oxidizing gas stream.

The system of the invention is exemplified by the following illustrative specific embodiments, it being understood that the flows and quantities are for illustrative purposes only and are not intended to be wholly definitive or exclusive with respect to scope or conditions.

EMBODIMENT I

This embodiment, taken in conjunction with FIGS. 1 and 2, illustrates the system of the invention as applied to the treatment of a municipal waste, and includes dry or oxidative combustion to recover the flocculating agent.

The influent 11 in this case (FIG. 1) is fed in at an average daily rate of fifty million gallons, and contains 5.0 ml. per liter of settleable solids (as determined with an Imhoff cone), about 90 p.p.m. of suspended solids, and about 80 p.p.m. of BOD (biological oxygen demand) wastes.

The influent 11 is fed to a degritter 12 for removal of large particles of waste, and thence to a mixer (not shown) where it is combined with recycle magnesium bisulfite in 5% solution form via line 39 in an amount sufficient to provide a concentration of 50 p.p.m., and with sufficient calcium hydroxide to form a floc, e.g., pH between about 8.0 and 9.0.

Liquid is permitted to remain in the first settling basin 16 for about one hour, during which time floc and settleable waste solids are withdrawn via stream or conduit 18.

The liquid leaving settling basin 16 is then conducted by conduit 19 to the secondary stage comprising aeration basin 20 and second settling basin 25, operating as an atmospheric pressure activated sludge system. Before introduction to the aeration basin 20 an additional quantity of 5% magnesium bisulfite solution is added via conduit 40 to form a 50 p.p.m. floc concentration, with pH adjustment to form the magnesium hydroxide floc, and aeration is conducted for about two hours. The aerated mixture of water, sludge, and floc is then fed via conduit 22 to the second settling basin 25 where it remains for about thirty minutes, and where scum and sludge are withdrawn respectively from the top and bottom and discharged via conduit 26. (In this illustrative embodiment no additional flocculating agent is added between the aeration basin and second settling basin.)

The effluent from the second settling basin 25 is passed through a trickle filter 29, in this case without the supplemental addition of flocculating agent, and thence to a bed of absorbent charcoal 32. Following the adsorbent charcoal bed 32 chlorine is added via conduit 35, and, after a brief period in the contact tank 36, the final effluent 38 is discharged as a potable water.

Referring to FIG. 2, wastes in conduits 18, 26 from the first and second settling basins 16, 25 (of FIG. 1) are combined and sent to thickener 50 to drier 51. The waste streams 14, 30 from the degritter 12 and trickle filter 29 of FIG. 1 are free of magnesium, and thus may be processed separately. Waste streams 18, 26 contain about 6–10 weight percent total solids, of which approximately one quarter is magnesium hydroxide.

The wastes of stream 18, 26 are sent to thickener 50 for concentration to about 30% solids and then to drier 51 (FIG. 2), where they are dried in a continuous kiln type drier to approximately 70 weight percent dry solids. From drier 51 they are transferred to furnace 53, another rotary kiln-type furnace, where they are exposed to oxidizing combustion conditions. As a consequence, organic wastes are oxidized chiefly to carbon dioxide, and the magnesium hydroxide is converted to magnesium oxide. Advantageously, the temperature in furnace 53 is maintained below about 2000° F.; preferably below 1800° F., so as to avoid dead-burning the magnesium oxide, which would make re-solution thereof by gaseous sulfur oxide in acid solution difficult.

Leaving furnace 53, the furnace ash—by now consisting predominantly of magnesium oxide with some calcium salts or oxides—is quenched in an extractor 55, an agitated vessel supplied with a 5% sulfurous acid solution via conduit 54. In extractor 55 the furnace ash is intimately contacted with the sulfurous acid solution in order to dissolve the magnesium by forming soluble magnesium bisulfite.

In the embodiment depicted in FIG. 2 the solution supplied to extractor 55 is, as before stated, a 5% sulfur dioxide solution. This may be prepared in an external absorber (not shown), which is a vertically elongated absorption tower through which water passes downwardly and up through which the products of sulfur combustion in air are passed.

As mentioned above, the sulfur oxide gas obtained by combustion of elemental sulfur or sulfur containing materials in air will normally predominate in sulfur dioxide, with only a small amount of sulfur trioxide being formed (in the absence of special combustion techniques or special oxidation catalysts). In most cases the amount of sulfur trioxide will be relatively small, and may ordinarily be retained with the sulfur dioxide and used in the process of the invention. Combustion of elemental sulfur at low temperatures and with relatively large amounts of excess air tends to favor sulfur trioxide formation, while the opposite conditions minimize the amount of sulfur trioxide likely to be formed. Minimizing the amount of sulfur trioxide is generally preferable in a system for treating water to produce an effluent with a minimum of hardness, as sulfur trioxide leads to the formation of soluble calcium sulfate (by reaction with calcium hydroxide used to prepare the floc). Sulfur dioxide, on the other hand, leads to the formation of insoluble calcium sulfite by reaction with the calcium hydroxide, and thus hardness or salt contamination of the treated effluent water is minimized by the use of sulfur dioxide rather than sulfur trioxide.

The amount of sulfur oxide (dioxide or trioxide) introduced into extractor 55 is generally stoichiometrically sufficient to convert all the magnesium to the bisulfite form. The necessary amount can be determined by simple experiment, that is, by determining the amount of sulfur oxide necessary to dissolve all of the magnesium oxide in a sample of furnace ash at a particular sulfurous acid concentration to be used in the commercial plant. In the present example, it is assumed that the sulfur oxide is entirely sulfur dioxide, and that it is available from line 54 as a 5% solution; the amount of such solution is at least stoichiometrically sufficient to form magnesium bisulfite.

Leaving extractor 55, the stream 56 is a solution of magnesium bisulfite in a small amount of excess sulfurous acid, and contains suspended therein the residual non-extractable components of furnace ash. These components are mainly calcium compounds, sand, etc., and other materials insoluble in the dilute sulfurous acid.

The stream in conduit 57 is then conducted to filter 58 where insoluble solids are removed. The effluent from filter 58, conducted via line 59, is an approximately 5% magnesium bisulfite solution, which is sent to storage 60 from when it may be recycled back to the waste water treatment process.

To prepare the floc, the magnesium bisulfite solution in storage vessel or tank 60 is continuously introduced (FIG. 1) via any one or more of lines or conduits 39, 40, 41, 42 into the main stream of water to be treated. Either before, during, or subsequent to the introduction of magnesium bisulfite solution, the main water stream is alkalized by the addition of a concentrated aqueous calcium hydroxide solution. When the magnesium bisulfite and calcium hydroxide are combined a double displacement reaction occurs which forms calcium bisulfite and magnesium hydroxide, the latter in a form of a sticky floc that normally settles in the main water stream.

The foregoing process may be conducted continuously, semi-continuously (i.e. with certain steps conducted batchwise), or batchwise, depending upon the particular equipment available and on the size of the plant. Reagent makeup costs are minimal, and are represented almost entirely by calcium hydroxide and sulfur. Only a relatively minor amount of makeup magnesium oxide, hydroxide or carbonate is needed, and impure forms of these may be used if added prior to extractor 55.

EMBODIMENT II

This embodiment, taken in conjunction with FIGURES 1 and 3, illustrates the system of the invention applied to the treatment of a municipal waste and includes dry combustion or oxidation of the magnesium-sulfur oxide salt at controlled temperatures to recover the flocculating agent.

Referring to FIGURES 1 to 3 in conjunction with each other the waste streams W from any one or more of conduits 14, 18, 26 and 30 are combined and sent to thickener 101. It will be noted that dry combustion may be used on waste streams 14 and 18 which contain no recoverable flocculating agent, or, alternatively, these streams may be processed separately for recovery of the waste contents.

After thickening of the stream to from 25 to 50% total solids on thickener 101, the stream is passed via conduit 102 to sulfur oxide saturator 103, where it is thoroughly mixed with gaseous sulfur oxide, or an aqueous solution of sulfur oxides, to attain a pH between 4.5 and 6.0; this treatment converts the magnesium hydrovide floc to magnesium sulfite and bisulfite (or magnesium sulfate and bisulfate). Since the bisulfite and bisulfate will be decomposed in the dry combustion step, extra sulfur oxide is added. In this dry combustion embodiment, the sulfur is oxidized from its quadrivalent to its hexavalent form in the furnace.

From sulfur oxide saturator 103, the stream is conveyed via conduit 104 to drier 105, where the stream is dried up to approximately 70 weight percent dry solids. The stream is then passed via conduit 106 to furnace 107, where, by exposure to oxidizing combustion conditions, the organic wastes are oxidized mainly to carbon dioxide and the magnesium sulfite to magnesium sulfate. With magnesium floc, the temperature is maintained below 2100° F., preferably below 2000° F., so as to avoid decomposing the sulfate, while if zinc alone or zinc and magnesium are present, the temperature of the furnace is maintained below 1200° F., preferably below 1100° F., to avoid decomposition.

The furnace ashes containing some 40 to 55 percent magnesium and/or zinc sulfate are passed via conduit 108 to extractor 109, to which is added water via conduit 110. After thorough mixing of the ashes and water to dissolve magnesium and/or zinc sulfates, the mixture is passed via conduit 111 to filter 112, or other equivalent type of mechanical separator. The filtrate representing the regenerated flocculating agent, namely a magnesium and/or zinc sulfate solution, is passed to storage tank 113, while the solids removed on filter 112 are passed to waste.

The filtrate in storage tank 113, consisting of a 3 to 7 weight percent of magnesium and/or zinc sulfate solution, is suitable for use in the waste-containing treatment process of FIGURE 1 as stream F, which is mixed with an alkali to attain a pH of about 8.5 from a floc and soluble calcium sulfate salts.

EMBODIMENT III

This embodiment, taken in conjunction with FIGS. 1 and 4, illustrates the system of the invention applied to the treatment of a municipal waste, and includes wet combustion or oxidation to recover the flocculating agent.

The wet or submerged combustion embodiment employs the waste disposal technique generally described in Zimmermann U.S. Patent 2,665,249 in which a liquid stream containing oxidizable waste is heated to a temperature of at least about 450° F. and up to the critical temperature of water and, at a sufficient pressure to maintain the water in the liquid phase, is contacted with compressed air or other compressed gas containing molecular oxygen. As a result of this contact, the oxidizable wastes are converted to carbon monoxide, carbon dioxide, and other gaseous or solid products of combustion. The foregoing technique is particularly applicable to the system of the present invention in that it substantially reduces the need for large and expensive equipment such as furnaces, extraction vessels, and the like.

Referring to FIGURES 1 and 4 in conjunction with each other, the waste stream W from any one or more of conduits 14, 18, 26, and 30 are combined and sent to sulfur dioxide saturator 61. It will be noted that wet combustion may be used on waste streams 14, 18, which contain no recoverable flocculating agent, or, alternatively, these streams may be processed separately for recovery of the waste contents.

In any event, the waste streams W generally contain from about 4 to about 12% total solids (dry basis), of which about half is the flocculating agent. In saturator 61, sufficient sulfur dioxide gas is added to lower the pH to between about 4.5 and 6.0, so as to convert the magnesium hydroxide floc to magnesium sulfite and bisulfite.

In the wet combustion embodiment it is unnecessary that the sulfur oxide gas contain any substantial amount of sulfur trioxide, inasmuch as the wet combustion process oxidizes sulfites and bisulfites to sulfates and bisulfates, respectively. Thus, while sulfur trioxide is not disadvantageous, it is unnecessary for the reason that sulfur is converted from its quadrivalent to its hexavalent form in the wet combustion reactor.

From sulfur dioxide saturator 61, the sulfurized waste stream is conducted via conduit 62 to a high pressure pump and to a heater, not shown, and thence to the wet combustion reactor 64. In reactor 64, high pressure air is admitted via conduit 66 in an amount sufficient to oxidize carbonaceous wastes to carbon dioxide and carbon monoxide, and to convert sulfites and bisulfites to sulfates and bisulfates, respectively. Additionally, any other foreign metallic wastes, such as calcium compounds, are converted to the corresponding oxides, carbonates or sulfates, many of which are insoluble in the mixture in wet combustion reactor 64.

From reactor 64, gaseous and liquid effluents are discharged. The gaseous effluent (not shown) is composed of nitrogen, carbon dioxide and carbon monoxide, water vapor, and lesser amounts of sulfur oxides, etc. The liquid effluent, discharged via conduit 67, is advantageously cooled (by indirect heat exchange against the incoming stream in conduit 62) and then sent to filter 68 for removal of insolubles such as sand, calcium compound, unoxidized organic materials, etc.

The filtrate from filter 68 is conducted via conduit 70 to storage facilities 71, and consists essentially of a dilute (about 3–7 weight percent) solution of magnesium sulfate, with lesser amounts of bisulfate and/or sulfite dissolved therein. This solution is suitable for recycle to the waste-containing water treatment process of FIG. 1 as stream F, where it is admixed with an alkali such as calcium hydroxide, to form a floc and to develop slightly alkaline conditions by adjusting the pH of the stream to between about 7.5 and 8.5.

Thus it is apparent that the wet combustion embodiment has the advantage of eliminating thickeners, furnaces, extraction vessels, and other equipment necessary in connection with dry combustion (FIG. 2) and, moreover, directly provides a stream that may be used as recycle to form the floc.

EMBODIMENT IV

This embodiment, taken in conjunction with the waste water treatment process of FIG. 1 and the process of FIG. 5, illustrates the invention as applied to an untreated mixture of magnesium (and/or zinc) hydroxide floc and waste (i.e. untreated with sulfur oxides). In this embodiment there need be no combustion whatever, and accordingly the concentrated wastes are recovered and are available for disposal as fertilizer or the like or burned without having any relation to the invention. In particular this embodiment is pertinent to the recovery of flocculating agents, in this instance magnesium and/or zinc, from the concentrate in water purification plants, where there is insufficient organic waste to warrant burning.

Referring to FIGS. 1 and 5, the waste stream W26, 30, containing both magnesium hydroxide floc and wastes, is conducted to a combined absorber-extractor 73, where sulfur dioxide gas or an aqueous sulfur oxide solution is admitted in an amount sufficient to lower the pH of the stream to between about 2 and 3, so as to convert the magnesium hydroxide into magnesium bisulfite. The influent stream to absorber 73 may contain as little as 1, or 2 weight percent total solids or as much as 12 or 15 percent, depending upon whether streams W are conducted directly to the absorber 73 or whether they are first concentrated, as by thickening, filtration, centrifugation, or the like. Indeed, concentration by filtering may provide a waste stream W of up to 50% total solids content, or even more, if efforts are made to obtain as dry a product as possible.

In absorber 73, the sulfur oxide gas (preferably sulfur dioxide to prevent calcium sulfate contamination of treated and purified water, although sulfur trioxide alone or in combination with the dioxide may be used) causes the magnesium to form the soluble sulfur oxide salts, namely the bisulfite and bisulfate. Ordinarily the sulfur oxide has little effect on organic wastes.

Absorber 73 may be provided with agitators to disperse the sulfur oxide gas within the liquid stream W entering the absorber 73 so as to provide intimate contact between the magnesium and the sulfur oxide. Alternatively, the absorber 73 may be an elongated column into which the waste stream W is admitted near the top and withdrawn near the bottom, and the sulfur oxide gas admitted near the bottom with excess being withdrawn at the top. That is, this embodiment is applicable to a continuous as well as a batch-type of operation.

From the absorber 73, the effluent stream 75 is conducted to a filter 76 or other type of mechanical separator to separate the soluble magnesium-sulfur oxide salt from insoluble wastes. Filter 76 may be a continuous (rotary) filter utilizing vacuum to facilitate separation of solids from liquid, and may include one or more stages wherein a water wash is used to further assist in removing soluble magnesium salts.

The discharge from filter 76 is composed of a concentrated waste stream 78, which is conducted to waste storage 79, and a liquid stream 80 conducted to storage 81. This liquid stream is essentially a dilute solution of magnesium bisulfite, and may either be recycled in its unconcentrated form to the system of FIG. 1 to serve as flocculating agent, or may be concentrated, as by evaporation, to provide a more concentrated solution.

Wastes stored in storage facilities 79 contain only a trace of magnesium compounds, and, since these wastes are essentially all organic, they may be utilized as natural fertilizer.

In the preceding description, reference was made to magnesium, but it is understood that except for the illustrative embodiment of FIG. 2 any of the magnesium compounds may be substituted by zinc.

It is therefore apparent that the inventive process affords exceptional flexibility in operation and design, and permits the advantageous use of large quantities of flocculating agent which, in the absence of an effective recycle system, could not otherwise be employed. As a consequence, waste-containing water may be conveniently, effectively, and economically purified, disposed of, or reused.

I claim as my invention:

1. In a process for the treatment of waste-containing water for purification, disposal, or reuse, the improvement of:
   (1) introducing into said waste-containing water a soluble sulfur oxide salt of zinc alkalized to form a hydroxide floc,
   (2) thereafter recovering a mixture of the zinc hydroxide floc and wastes,
   (3) contacting said mixture of zinc hydroxide floc and wastes with a sulfur oxide to dissolve the zinc as a soluble sulfur oxide salt,
   (4) thereafter separating said soluble sulfur oxide salt of zinc from said wastes, and
   (5) cycling said dissolved sulfur oxide salt of zinc to step (1).

2. Process of claim 1 wherein said separation is effected by wet combustion of said mixture and subsequent filtration.

3. Process of claim 1 wherein said separation is effected solely by filtration.

4. In a process for the treatment of waste-containing water for purification, disposal, or reuse, the improvement of:
   (1) introducing into said waste-containing water a soluble sulfur oxide salt or zinc alkalized to form a hydroxide floc,
   (2) thereafter recovering a mixture of the zinc hydroxide floc and wastes,
   (3) contacting said mixture of zinc hydroxide floc and wastes with a sulfur oxide to form a soluble sulfur oxide salt or zinc,
   (4) heating said mixture and said salt under oxidizing combustion conditions and at a temperature sufficiently low to avoid decomposition of zinc sulfate,
   (5) dissolving said zinc sulfate in water, and
   (6) cycling said zinc sulfate to step (1).

5. In a process for the treatment of oxidizable organic waste-containing water for purification, disposal, or reuse, the improvement of:
(1) introducing into said waste-containing water a soluble sulfur oxide salt of magnesium alkalized to form a hydroxide floc,
(2) thereafter recovering a mixture of the magnesium hydroxide floc and wastes,
(3) contacting said magnesium of step (2) with a sulfur oxide to dissolve the magnesium as a soluble sulfur oxide salt,
(4) and cycling said dissolved sulfur oxide salt of magnesium to step (1).

6. Process of claim 5 wherein said sulfur oxide is sulfur dioxide.

7. Process of claim 5 wherein said sulfur oxide is sulfur trioxide.

8. Process of claim 5 wherein said sulfur oxide is a mixture of sulfur dioxide and sulfur trioxide.

9. Process of claim 5 wherein said magnesium of step (2) is an ash containing magnesium oxide obtained by burning the magnesium hydroxide floc and wastes under oxidizing combustion conditions.

10. Process of claim 5 wherein said magnesium of step (2) is a mixture of the magnesium hydroxide floc and wastes, and which process includes the step of subjecting said mixture to dry combustion with an oxygen-containing gas.

11. Process of claim 5 wherein said magnesium of step (2) is a mixture of the magnesium hydroxide floc and wastes, and which process includes the step of subjecting said mixtures to liquid phase combustion with an oxygen-containing gas.

12. Process of claim 5 wherein said magnesium of step (2) is a mixture of the magnesium hydroxide floc and wastes not previously treated with sulfur oxides, and which process includes the step of extracting said magnesium from said mixture.

References Cited

UNITED STATES PATENTS

| | | | |
|---|---|---|---|
| 718,465 | 1/1903 | Jewell | 210—45 |
| 1,709,398 | 4/1929 | Heath | 23—128 |
| 1,900,392 | 3/1933 | Stump | 23—128 |
| 1,964,747 | 7/1934 | Sweet et al. | 23—128 |
| 3,163,598 | 12/1964 | Yoshihara et al. | 210—47 |
| 3,171,804 | 3/1965 | Rice | 210—53 |
| 3,268,443 | 8/1966 | Cann | 210—51 |

OTHER REFERENCES

Phelps, E. B., et al.: A Laboratory Study of the Guggenheim Bio-Chemical Process, Sewage Works Journal, January 1942, vol. 14, pp. 104–106 and 113–119 relied on.

Betz Handbook of Industrial Water Conditioning, Betz Laboratories, Inc., Philadelphia, Pa. fifth edition, 1958, pp. 40 to 44.

MICHAEL E. ROGERS, *Primary Examiner.*